US011747991B2

(12) United States Patent
Zhang et al.

(10) Patent No.: US 11,747,991 B2
(45) Date of Patent: Sep. 5, 2023

(54) METHOD FOR DATA STORAGE, GENERAL SERVICE ENTITY DEVICE, AND STORAGE MEDIUM

(71) Applicant: BOE TECHNOLOGY GROUP CO., LTD., Beijing (CN)

(72) Inventors: Qian Zhang, Beijing (CN); Junjie Zhao, Beijing (CN); Jing Su, Beijing (CN); Yanqiu Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 183 days.

(21) Appl. No.: 17/296,628

(22) PCT Filed: Nov. 28, 2019

(86) PCT No.: PCT/CN2019/121611
§ 371 (c)(1),
(2) Date: May 25, 2021

(87) PCT Pub. No.: WO2020/108563
PCT Pub. Date: Jun. 4, 2020

(65) Prior Publication Data
US 2022/0019354 A1 Jan. 20, 2022

(30) Foreign Application Priority Data
Nov. 28, 2018 (CN) .............. 201811436152

(51) Int. Cl.
G06F 12/00 (2006.01)
G06F 3/06 (2006.01)
G06F 11/14 (2006.01)

(52) U.S. Cl.
CPC ............ *G06F 3/0619* (2013.01); *G06F 3/067* (2013.01); *G06F 3/0659* (2013.01);
(Continued)

(58) Field of Classification Search
CPC ...... G06F 3/0619; G06F 3/0659; G06F 3/067; G06F 11/1451; G06F 11/1464;
(Continued)

(56) References Cited

U.S. PATENT DOCUMENTS

2007/0162686 A1* 7/2007 Shimono .............. H04N 1/2112
711/100
2015/0242397 A1 8/2015 Zhuang
(Continued)

FOREIGN PATENT DOCUMENTS

| CN | 101201783 A | 6/2008 |
| CN | 104243425 A | 12/2014 |

(Continued)

OTHER PUBLICATIONS

International Search Report of PCT/CN2019/121611 in Chinese, dated Mar. 6, 2020 with English translation.
(Continued)

*Primary Examiner* — John A Lane
(74) *Attorney, Agent, or Firm* — Collard & Roe, P.C.

(57) ABSTRACT

The present disclosure provides a method for data storage, a general service entity device, and a storage medium. The method for data storage includes: by adopting a general service entity, receiving data sent by an application entity; performing a lock setting or an overflow setting; selecting a retention strategy for previously stored data according to the lock setting or the overflow setting in the case of satisfying a data overflow condition; and storing part or all of received data according to the retention strategy.

19 Claims, 12 Drawing Sheets

(52) U.S. Cl.
CPC ...... *G06F 11/1451* (2013.01); *G06F 11/1464* (2013.01); *G06F 11/1469* (2013.01)

(58) Field of Classification Search
CPC .. G06F 11/1469; G06F 3/0652; G06F 3/0673; G06F 3/0608
See application file for complete search history.

(56) References Cited

U.S. PATENT DOCUMENTS

| | | | |
|---|---|---|---|
| 2017/0344618 A1* | 11/2017 | Horowitz | ............ G06F 11/2097 |
| 2018/0088812 A1 | 3/2018 | Lee | |
| 2018/0217777 A1* | 8/2018 | Jiang | .................. G06F 13/4282 |

FOREIGN PATENT DOCUMENTS

| | | | |
|---|---|---|---|
| CN | 106155595 A | * | 11/2016 |
| CN | 106155595 A | | 11/2016 |

OTHER PUBLICATIONS

Written Opinion of the International Searching Authority of PCT/CN2019/121611 in Chinese, dated Mar. 6, 2020 with English translation.
Indian Office Action in Indian Application No. 202117028278 dated Jan. 10, 2023 with English translation.

\* cited by examiner

METHOD FOR DATA STORAGE, GENERAL SERVICE ENTITY DEVICE, AND STORAGE MEDIUM

CROSS REFERENCE TO RELATED APPLICATIONS

This application is the National Stage of PCT/CN2019/121611 filed on Nov. 28, 2019, which claims priority under 35 U.S.C. § 119 of Chinese Application No. 201811436152.0 filed on Nov. 28, 2018, the disclosure of which is incorporated by reference.

TECHNICAL FIELD

The present disclosure relates to the field of data storage, in particular to a method for data storage, a general service entity device, and a storage medium.

BACKGROUND

In the field of data storage, data uploaded by application entities may be received through general service entities. In the case where environment values of the application entity change rapidly and require high accuracy, for example, in scenarios such as ocean currents and submarine volcano temperature monitoring, the application entity uploads data at a high speed, which may soon break through the storage limit of the general service entity on data resource capacity. When the uploaded data reaches the maximum resource capacity storage limit of the general service entity, data may overflow.

SUMMARY

The present disclosure provides a method for data storage, a general service entity device, and a storage medium.

According to the first aspect of the present disclosure, a method for data storage is provided, and the method includes: by adopting a general service entity, receiving data sent by an application entity; performing a lock setting or an overflow setting; selecting a retention strategy for previously stored data according to the lock setting or the overflow setting in a case of satisfying a data overflow condition; and storing part or all of received data according to the retention strategy.

According to the second aspect of the present disclosure, a method for data storage is provided, and the method includes: by adopting an application entity, uploading data to a general service entity, where the data is stored in the general service entity; and replacing stored data in the general service entity with newly uploaded data according to a retention strategy determined based on a lock setting or an overflow setting of the general service entity in a case of satisfying a data overflow condition.

According to the third aspect of the present disclosure, a method for data storage is provided, and the method includes: by adopting a general service entity, receiving and storing data sent by an application entity; and in a case of satisfying a data overflow condition, the general service entity retaining first data in each time interval and sequentially replacing remaining data in each time interval with newly received data in a sequence of storage time according to a preset overflow time interval.

According to the fourth aspect of the present disclosure, a general service entity device is provided, and the general service entity device includes: a receiving unit, configured to receive data sent by an application entity; a storage unit, configured to store the data received by the receiving unit; and a selection unit, configured to perform a lock setting or an overflow setting for stored data in a case of satisfying a data overflow condition and select a retention strategy for the stored data according to the lock setting or the overflow setting of the stored data; and the storage unit is further configured to store newly received data according to the retention strategy.

According to the fifth aspect of the present disclosure, a computer readable storage medium for storing a computer readable program is provided, and the program enables a computer to perform the method for data storage as described above.

The above aspects of the present disclosure provide a retention strategy of sending an early warning to the application entity in the case where data is about to overflow, so as to adjust the stored data in time, and further provide a retention strategy of sending notification to the application entity in the case where data overflows, so as to adjust the stored data in time, so that data loss is accordingly avoided.

BRIEF DESCRIPTION OF THE DRAWINGS

By describing the embodiments of the present disclosure in more detail with reference to the accompanying drawings, the above and other objectives, features, and advantages of the present disclosure may become more apparent. The drawings are used to provide a further understanding of the embodiments of the present disclosure, and constitute a part of the specification. The drawings are used to explain the present disclosure together with the embodiments of the present disclosure, and are not limitative to the present disclosure. The same reference numerals in different drawings are used to refer to the same described components or steps.

DETAILED DESCRIPTION

The technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Figure 1:
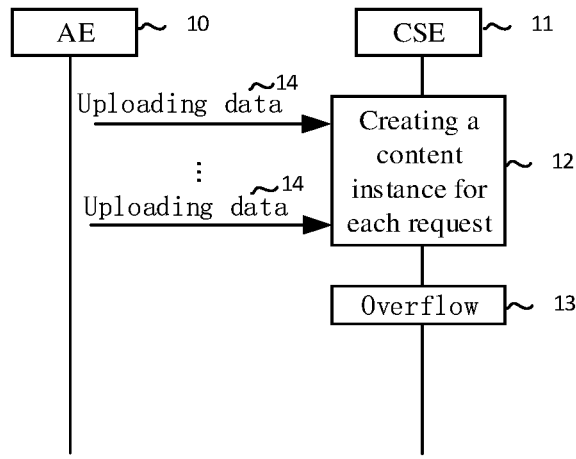
FIG. 1 is a schematic diagram of a data storage system used to implement an embodiment of the present disclosure.

First, a data storage system for implementing an embodiment of the present disclosure is described with reference to FIG. 1. As illustrated in FIG. 1, in the data storage system, an application entity (AE) 10 uploads data 14 to a general service entity (i.e., a common service entity, CSE) 11. Then the general service entity 11 creates a content instance for each request of the application entity 10. For example, the application entity 10 may be a sensor, such as a sensor of an air conditioner, and the data uploaded to the general service entity may be data such as humidity, temperature, etc. In this way, the general service entity 11 may create a resource container for the sensor, and the information of the content instance, such as humidity, temperature, and the like, may be accordingly stored in the resource container. In the case where the data uploaded by the application entity 10 reaches the maximum capacity storage limit of the general service entity, it may cause data overflow 13. The present disclosure provides a retention strategy of sending an early warning to the application entity in the case where data is about to overflow, so as to adjust the stored data in time, and further provides a retention strategy of sending notification to the application entity in the case where data overflows, so as to adjust the stored data in time.

The method for data storage used to implement the embodiments of the present disclosure is described below with reference to FIG. 2. The method can be executed by the general service entity 11.

Figure 2:
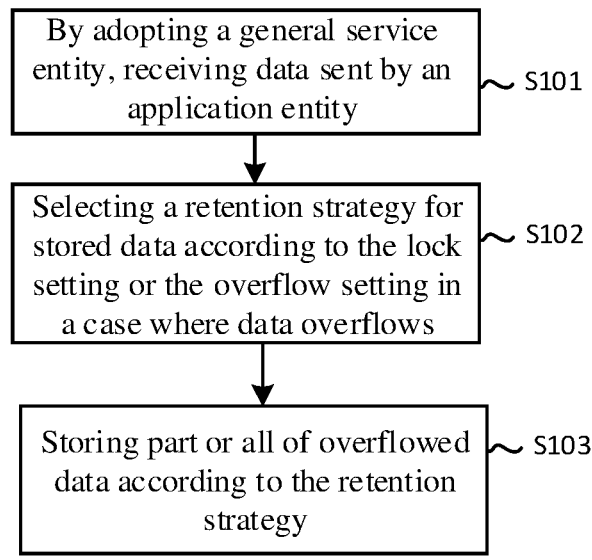
FIG. 2 is a flowchart of a method for data storage used to implement an embodiment of the present disclosure.

As illustrated in FIG. 2, in Step S101, the general service entity 11 may receive data sent by the application entity 10. For example, the application entity 10 may be a sensor as described above.

In Step S102, in the case where data overflows, the general service entity 11 selects a corresponding retention strategy for stored data according to a lock setting or an overflow setting.

In Step S103, according to the retention strategy, part or all of the overflow data is stored.

As mentioned above, when data overflow occurs, the normal practice is to directly replace the old stored data with the newly uploaded data, but this may lead to loss of the original record, which is impossible to realize functions such as obtaining the history record table, history record graph, or the like, and the flexibility is poor. In addition, the normal practice also lacks the following functions: the retention strategy of notifying the application entity when data overflows so as to adjust the stored data in time, and the retention strategy of alerting the application entity when data is about to overflow so as to adjust the stored data in time. However, in the case where a corresponding retention strategy is selected for the stored data according to the lock setting or the overflow setting, the data loss can be accordingly avoided.

Figure 3:
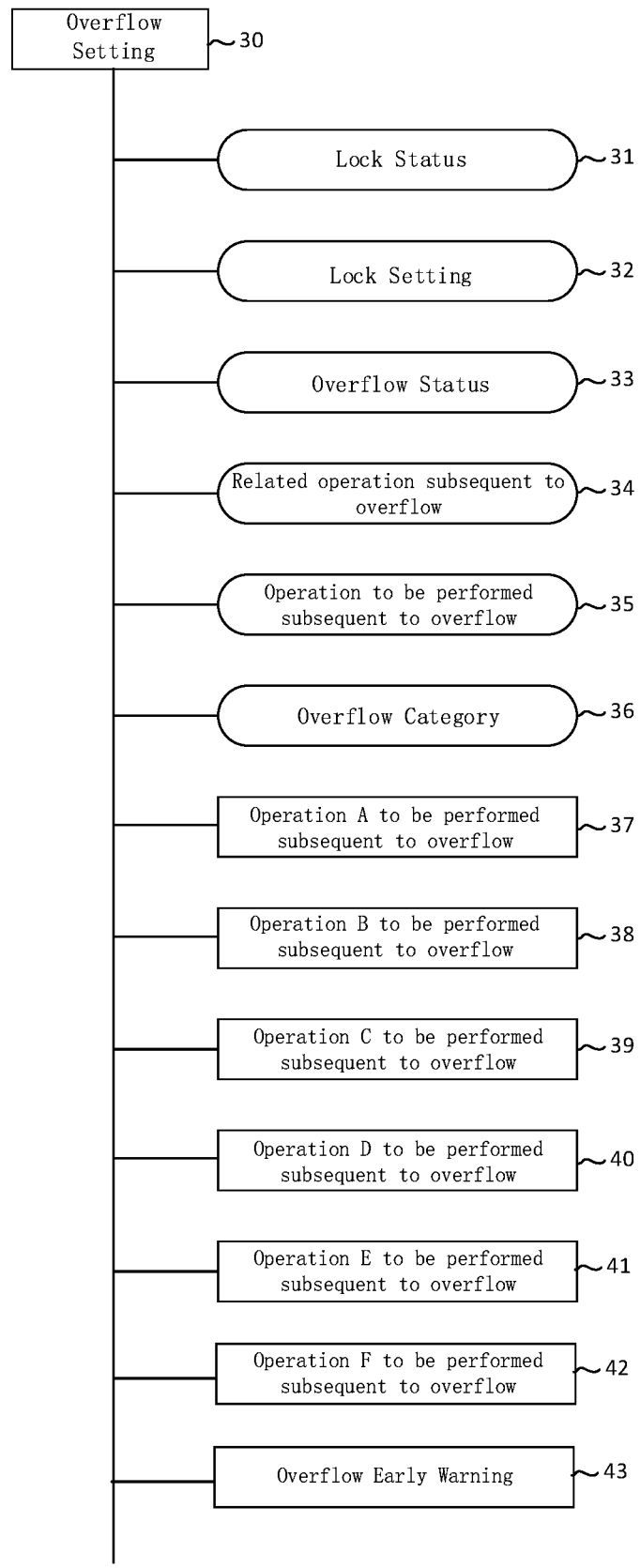
FIG. 3 is a schematic diagram of resources for overflow setting according to an embodiment of the present disclosure.

Hereinafter, the resource of the overflow setting (overflowCfg) 30 according to an embodiment of the present disclosure is described with reference to FIG. 3. As mentioned above, the general service entity 11 may create one resource container for the application entity 10, and the information of the content instance, such as humidity, temperature, and the like, can be accordingly stored in the resource container. In addition, the general service entity 11 may also create the resource of the overflow setting (overflowCfg) 30 for the application entity 10 in the resource container, which may serve as the sub-resource of the resource container to store information related to overflow.

The overflow setting 30 may include a status of whether the data is performed the lock setting (overflowReserveStatus), that is, a lock status 31.

The lock setting (overflowReserve) 32 may include locking the data according to the lock time period or rate of change of lock data. When data overflows, the stored data generated during the preset lock time period or the stored data in accord with the preset rate of change of lock data is locked and may not be deleted. Alternatively, the lock setting (overflowReserve) and the status of whether the data is performed the lock setting (overflowReserveStatus) may also be provided in the resource container, which may serve as the sub-resource or attribute value of the resource container to store information related to lock.

For example, the lock status 31 may be set to Yes/No (or True/False), so as to clearly show whether the data is performed the lock setting.

The lock setting 32 may include setting according to the lock time period. For example, the lock time period can be preset, and then the data generated during the lock time period is locked and may not be deleted when data overflow occurs. For example, the lock time period may be set as 00:00:00-00:07:00 and 01:00:00-02:59:59, and then the data (dataGenerationTime) generated in these two time periods is locked and may not be deleted when data overflow occurs. When one or both of the above two lock time periods are deleted in the setting, the data corresponding to the deleted time period accordingly loses the locked attribute and may no longer be limited by the lock strategy when the data overflows. It should be noted that the above examples are merely illustrative and do not limit the content to be protected by the present disclosure, and the present disclosure may also include other appropriate examples.

In addition, for example, the lock setting 32 may include setting according to the rate of change of lock data. For example, the rate of change of lock data can be preset, and then data greater than the rate of change of lock data is locked and may not be deleted when data overflow occurs. For example, the rate of change of lock data may be set as 1 km/h. When the data overflow occurs, the data instance in the data list is screened. If the rate of change of two data separated by one hour is greater than one kilometer, all data between the two data may be locked and may not be deleted when overflow occurs.

In addition, the overflow setting 30 may further include setting a specific overflow category (overflowCat) 36.

For example, the overflow category 36 may be set to the maximum bit value (maxByteSize), the maximum number of instances (maxNrOfInstances), the maximum instance servicelife (maxInstanceAge), etc. It should be noted that the above settings are merely illustrative and do not limit the content to be protected by the present disclosure, and the present disclosure may further include other appropriate settings.

Further, the overflow setting may further include setting the overflow status (overflowStatus) 33 of whether the overflow occurs.

For example, the overflow status 33 can be set to Yes/No (or True/False), so as to clearly show whether overflow occurs. In addition, different overflow categories 36 may also be set to any overflow status. For example, the overflow status may be set for one or more of a group consisting of the maximum bit value, the maximum number of instances, and the maximum instance service life.

Further, the overflow setting 30 may further include setting whether a related operation (overflowCtrl) is performed subsequent to the overflow 34.

For example, whether a related operation is performed subsequent to the overflow 34 may be set to Yes/No (or True/False), so as to clearly show whether a related operation is performed subsequent to the overflow.

Further, the overflow setting 30 may further include setting the operation (overflowOp) to be performed subsequent to the overflow 35, and the setting corresponds to at least one of the above retention strategies.

For example, operations to be performed subsequent to the overflow may be set with different numbers, and for example, may include an operation A to be performed subsequent to the overflow 37 (overflowOpOneDescription), an operation B to be performed subsequent to the overflow 38 (overflowOpTwoDescription), an operation C to be performed subsequent to the overflow 39 (overflowOpThreeDescription), an operation D to be performed subsequent to the overflow 40 (overflowOpFourDescription), an operation E to be performed subsequent to the overflow 41 (overflowOpFiveDescription), and an operation F to be performed subsequent to the overflow 42 (overflowOpSixDescription). The different numbers indicate different operations, so as to clearly show whether a related operation is performed subsequent to the overflow or which retention strategy is selected.

For example, selecting the corresponding retention strategy for the data according to the overflow setting may include selecting at least one of the following retention strategies: performing a local backup of the stored data, uploading and backing up the stored data, partially retaining the stored data according to a point in time, partially retaining the stored data according to a rate of change, partially retaining the stored data according to a difference manner, and replacing the stored data with newly uploaded data.

For example, the operation A to be performed subsequent to the overflow may be set as performing a local backup of the stored data as described above.

Figure 4:
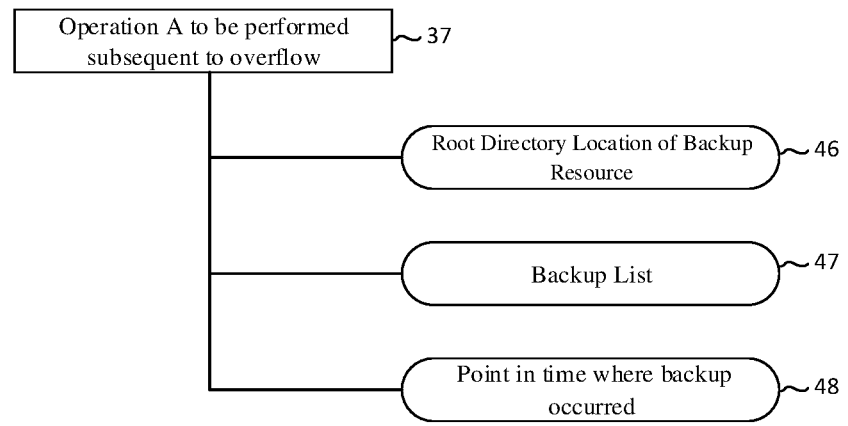
FIG. 4 is a schematic diagram of an operation A to be performed subsequent to setting an overflow resource according to an embodiment of the present disclosure.

FIG. 4 is a schematic diagram of an operation A to be performed subsequent to setting an overflow resource according to an embodiment of the present disclosure. As illustrated in FIG. 4, in the case where the operation A 37 is to be performed after overflow, different attribute values can be set for the operation A to perform the local backup. For example, the root directory location of the backup resource (overflowBackUpPosition) 46, the backup list (overflowBackUpList) 47, and the point in time where the backup occurred (overflowBackUpTimePoint) 48 can be set for the operation A. It should be noted that the above settings are merely illustrative and do not limit the content to be protected by the present disclosure, and the present disclosure may also include other appropriate settings.

For example, the operation B to be performed subsequent to the overflow may be set as uploading and backing up the stored data as described above.

Figure 5:
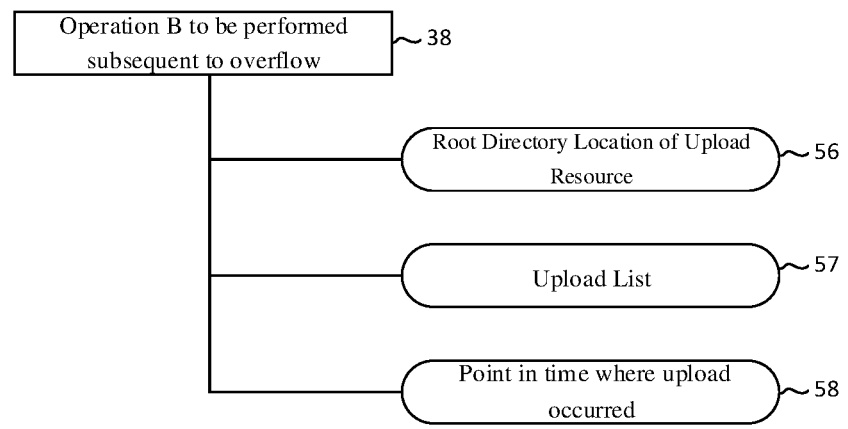
FIG. 5 is a schematic diagram of an operation B to be performed subsequent to setting an overflow resource according to an embodiment of the present disclosure.

FIG. 5 is a schematic diagram of an operation B to be performed subsequent to setting an overflow resource according to an embodiment of the present disclosure. As illustrated in FIG. 5, in the case where the operation B 38 is to be performed after overflow, the root directory location of the upload resource (overflowUpLoadPosition) 56, the upload list (overflowUpLoadList) 57, and the point in time where the upload occurred (overflowUpLoadTimePoint) 58 may also be set for the operation B. It should be noted that the above settings are merely illustrative and do not limit the content to be protected by the present disclosure, and the present disclosure may also include other appropriate settings.

Figure 6:
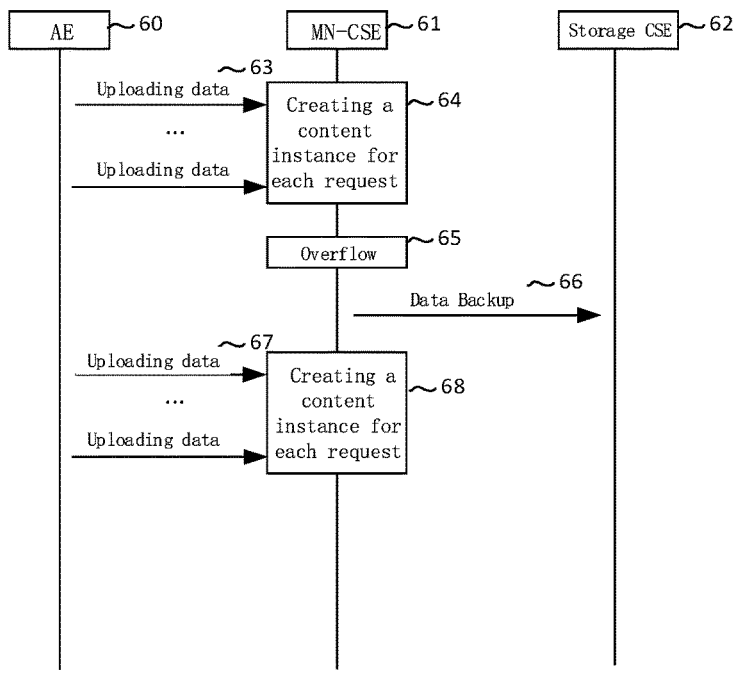
FIG. 6 is a schematic diagram of an example of uploading and backing up stored data according to an embodiment of the present disclosure.

FIG. 6 is a schematic diagram of an example of uploading and backing up stored data according to an embodiment of the present disclosure. As illustrated in FIG. 6, the AE 60 uploads data 63 to the middle node general service entity (i.e., a middle node common service entity, MN-CSE) 61, and then the MN-CSE 61 creates a content instance 64 for each request of the AE 60. In the case where the data uploaded by the AE 60 reaches the maximum capacity storage limit of the MN-CSE 61, data overflow 65 occurs. In this case, the MN-CSE 61 may upload the stored data to other general service entities (for example, the storage CSE 62 illustrated in FIG. 6) to perform data backup 66, and delete the data originally stored in the MN-CSE 61. Then there is extra capacity in the MN-CSE 61 to store the data continuously uploaded by the AE60, and the MN-CSE 61 continues to create a content instance 68 for each request of the AE 60.

For example, the operation C to be performed subsequent to the overflow may be set to partially retain the stored data according to a point in time.

Figure 7:
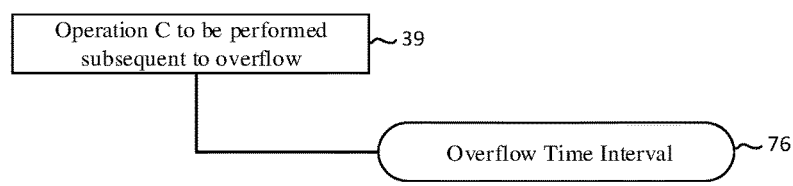
FIG. 7 is a schematic diagram of an operation C to be performed subsequent to setting an overflow resource according to an embodiment of the present disclosure.

FIG. 7 is a schematic diagram of an operation C to be performed subsequent to setting an overflow resource according to an embodiment of the present disclosure. As illustrated in FIG. 7, in the case where the operation C 39 is to be performed after overflow, different attribute values can be set for the operation C to partially retain the stored data according to the time point. For example, an overflow time interval (overflowReserveTimePeriod) 76 may be set for the operation C. It should be noted that the above settings are merely illustrative and do not limit the content to be protected by the present disclosure, and the present disclosure may also include other appropriate settings.

Figure 8:
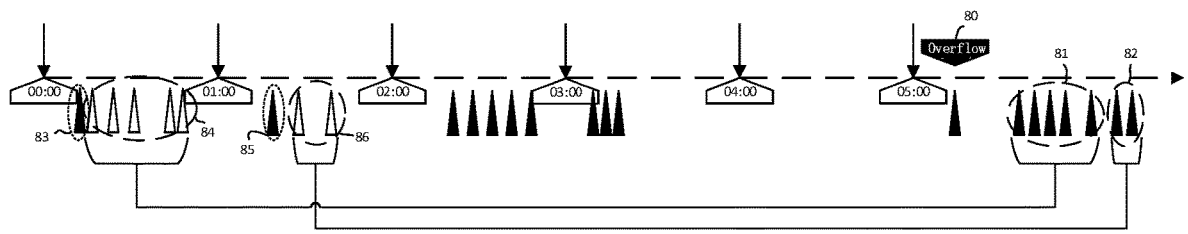
FIG. 8 is a schematic diagram of an example of partially retaining stored data according to a point in time according to an embodiment of the present disclosure.

FIG. 8 is a schematic diagram of an example of partially retaining stored data according to a point in time according to an embodiment of the present disclosure. As illustrated in FIG. 8, supposing that the overflow time interval 76 is set to 1 hour, the first integer point in the data queue is assumed as the start value, and the first piece of data in this time period is retained. As illustrated in FIG. 8, five pieces of data 81 are newly added after the overflow 80 at time 05:20, and there are six pieces of data in the time period 00:00-01:00. Then the first integer point in the queue is taken as the start point, the first piece of data 83 is retained, and the remaining five pieces of data 84 are replaced, that is, the five pieces of data 84 after the six pieces of data in the time period 00:00-01:00 are deleted and replaced with five pieces of data 81 newly added after the overflow at time 05:20. Next, two pieces of data 82 are added, time 01:00 is the important point of the new time interval after time 00:00, the first piece of data 85 after time 01:00 is retained, and the last two pieces of data 86 of the three pieces of data in the time period 01:00-02:00 are deleted and replaced with two pieces of data 82 newly added after the overflow at time 05:20.

For example, the operation D to be performed subsequent to the overflow may be set to partially retain the stored data according to a rate of change as described above.

Figure 9:
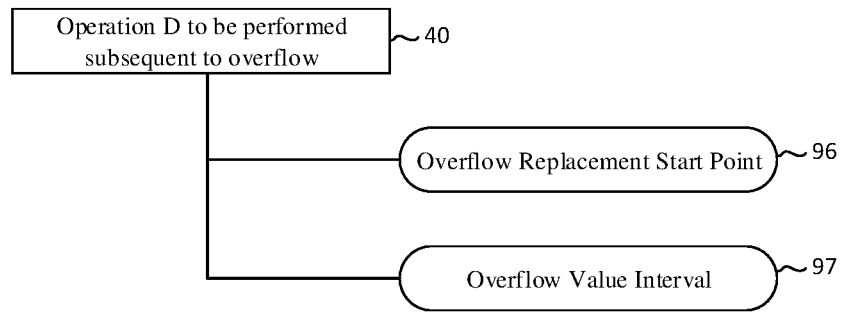
FIG. 9 is a schematic diagram of an operation D to be performed subsequent to setting an overflow resource according to an embodiment of the present disclosure.

FIG. 9 is a schematic diagram of an operation D to be performed subsequent to setting an overflow resource according to an embodiment of the present disclosure. As illustrated in FIG. 9, in the case where the operation D 40 is to be performed subsequent to overflow, different attribute values can be set for the operation D to partially retain the stored data according to a rate of change. For example, the overflow replacement start point (overflowReserveValuePoint) 96, the overflow value interval (overflowReserveValueChange) 97, and the like may be set for the operation D. It should be noted that the above settings are merely illustrative and do not limit the content to be protected by the present disclosure, and the present disclosure may also include other appropriate settings.

Figure 10A:
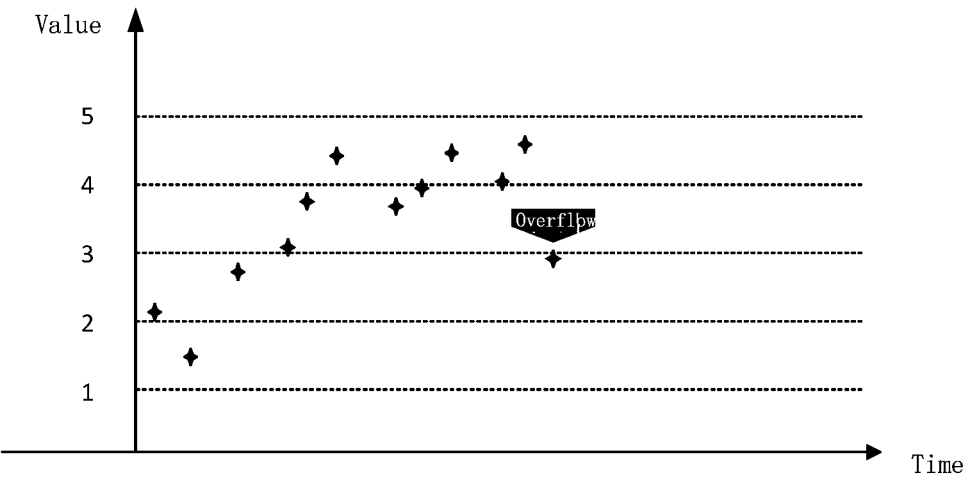
FIG. 10(a) and FIG. 10(b) are schematic diagrams of an example of partially retaining stored data according to a rate of change according to an embodiment of the present disclosure.
Figure 10B:
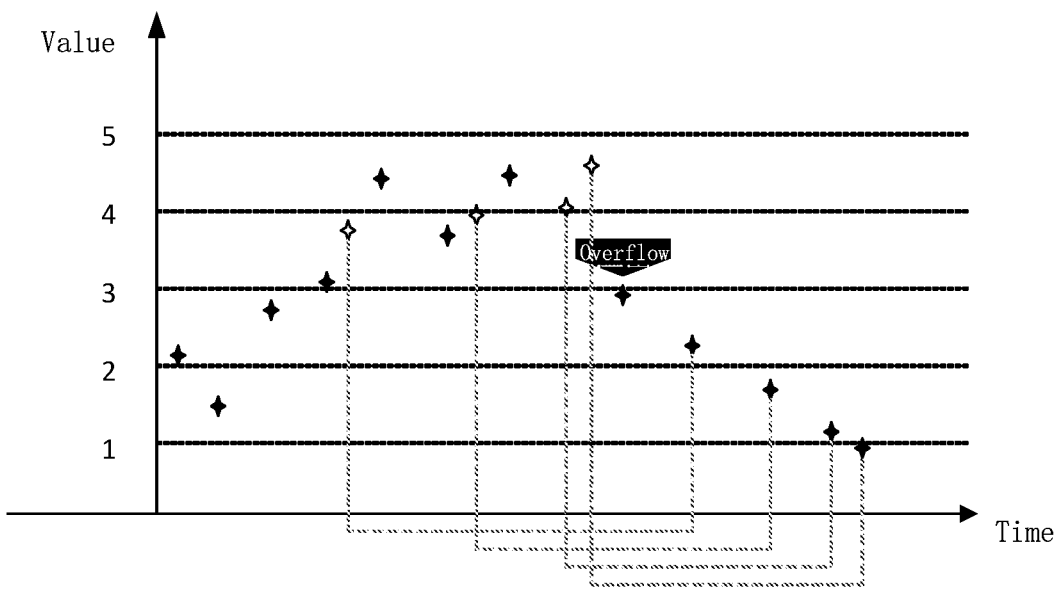

FIG. 10(*a*) and FIG. 10(*b*) are schematic diagrams of an example of partially retaining stored data according to a rate of change according to an embodiment of the present disclosure. As illustrated in FIG. 10(*a*) and FIG. 10(*b*), assuming that the maximum amount of data that the general service entity can store is set to 12, overflow occurs when the twelfth piece of data is established. Assuming that the overflow replacement start point 96 is set to 2, and the overflow value interval 97 is set to 1, it means that starting from the overflow, the replacement is performed from the second piece of data originally stored, and the last piece of data of the two adjacent pieces of original data which are of values in the same interval is replaced. As illustrated in FIG. 10(*b*), as time goes by, overflow occurs at the twelfth piece of data. When the thirteenth piece of new data is established after the overflow occurs, according to the rules, starting from the leftmost side of the time axis, the first piece of data originally stored is the start point and is not replaced; the second piece of data originally stored is in the 1-2 interval, which is different from the 2-3 interval of the first piece of data originally stored (that is, the value of the first piece of data originally stored and the value of the second piece of data originally stored are not in the same interval), and is not replaced; the third piece of data originally stored is in the 2-3 interval, which is different from the 1-2 interval of the second piece of data originally stored, and is not replaced; the fourth piece of data originally stored is in the 3-4 interval, which is different from the 2-3 interval of the third piece of data originally stored, and is not replaced; the fifth piece of data originally stored is in the 3-4 interval, which is identical to the 3-4 interval of the fourth piece of data originally stored (that is, the value of the fifth piece of data originally stored and the value of the fourth piece of data originally stored are in the same interval), and is deleted and replaced, and the fifth piece of data is replaced with the thirteenth piece of new data; and so on.

For another example, when the fourteenth piece of new data is created, analysis is the same as described above. The 4-5 interval of the sixth piece of data originally stored is different from the 3-4 interval of the fifth piece of data originally stored, and the sixth piece of data originally stored is not replaced; the 3-4 interval of the seventh piece of data originally stored is different from the 4-5 interval of the sixth piece of data originally stored, and the seventh piece of data originally stored is not replaced; the 3-4 interval of the eighth piece of data originally stored is identical to the 3-4 interval of the seventh piece of data originally stored, and the eighth piece of data originally stored is deleted and replaced with the fourteenth piece of new data; and so on.

For example, the operation E to be performed subsequent to the overflow may be set to partially retain the stored data according to a difference manner.

Figure 11:
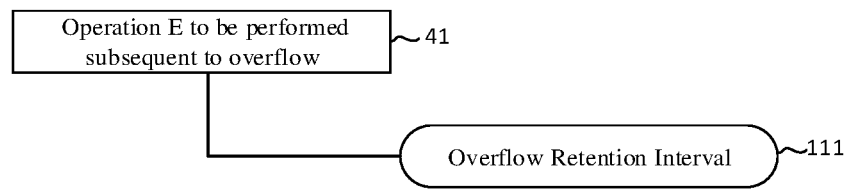
FIG. 11 is a schematic diagram of an operation E to be performed subsequent to setting an overflow resource according to an embodiment of the present disclosure.

FIG. 11 is a schematic diagram of an operation E to be performed subsequent to setting an overflow resource according to an embodiment of the present disclosure. As illustrated in FIG. 11, in the case where the operation E 41 is to be performed after overflow, different attribute values can be set for the operation E 41 to partially retain the stored data according to a difference manner. For example, the overflow retention interval (overflowReserveInterval) 111 and the like can be set for the operation E 41. It should be noted that the above settings are merely illustrative and do not limit the content to be protected by the present disclosure, and the present disclosure may also include other appropriate settings.

Figure 12A:
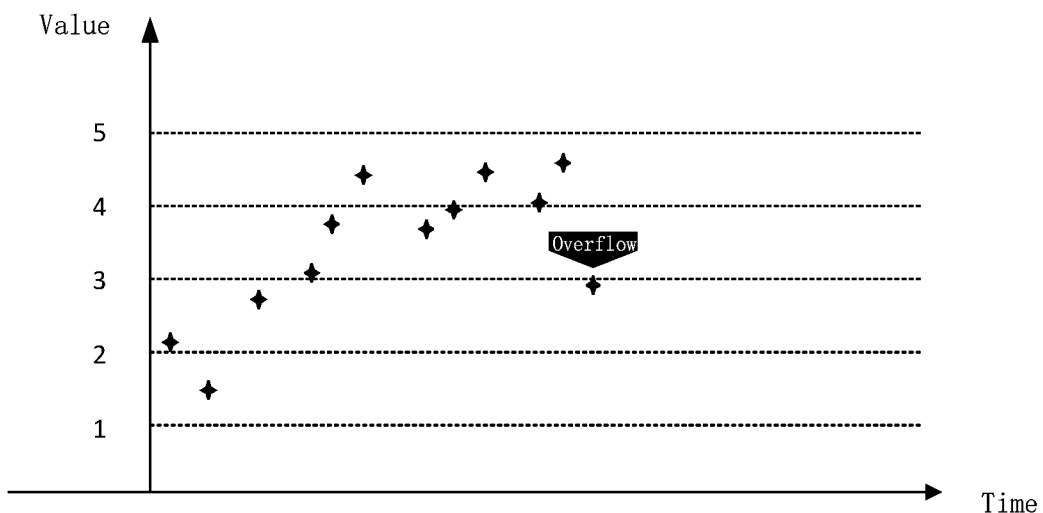
FIG. 12(a) and FIG. 12(b) are schematic diagrams of an example of partially retaining stored data in a difference manner according to an embodiment of the present disclosure.
Figure 12B:
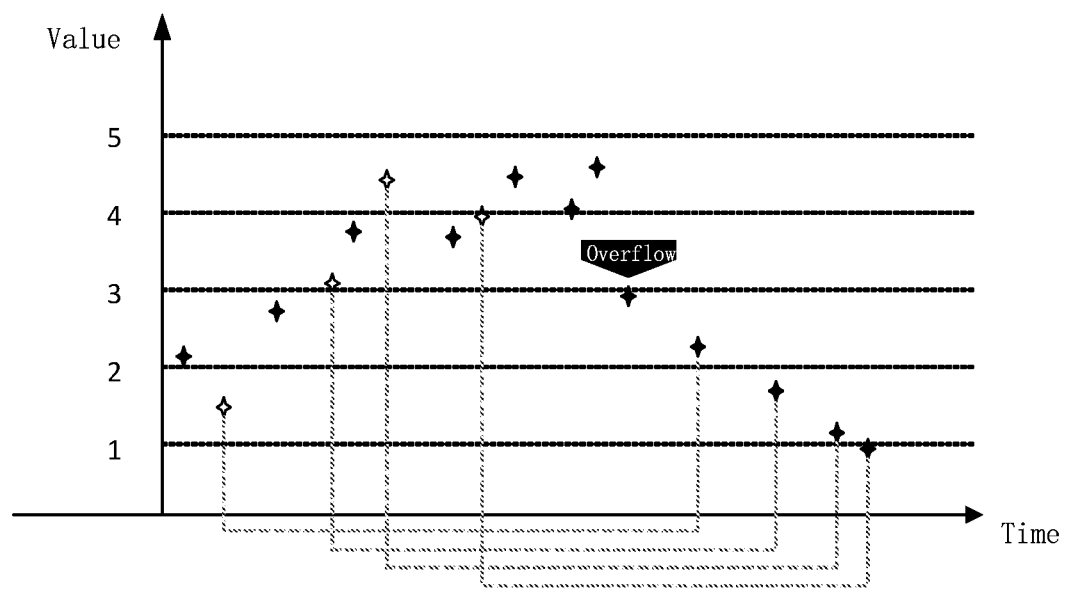

FIG. 12(*a*) and FIG. 12(*b*) are schematic diagrams of an example of partially retaining stored data in a difference manner according to an embodiment of the present disclosure. As illustrated in FIG. 12 (*a*) and FIG. 12(*b*), assuming that the maximum amount of data that the general service entity can store is set to 12, overflow occurs when the twelfth piece of data is established. Assuming that the overflow retention interval 111 is set to 1, as time goes by, starting from the leftmost side of the time axis, retention is performed from the first piece of data. Adding the first piece of new data (corresponding to the thirteenth piece of new data) after the overflow corresponds to deleting the second piece of data originally stored in the queue, adding the second piece of new data (corresponding to the fourteenth piece of new data) after the overflow corresponds to deleting the fourth piece of data originally stored in the queue, adding the third piece of data (corresponding to the fifteenth piece of new data) after the overflow corresponds to deleting the sixth piece of data originally stored in the queue, and so on.

For example, the operation F to be performed subsequent to the overflow may be set to replace the stored data with newly uploaded data as described above. This method is the same as the traditional method of directly replacing the originally stored data with the overflowed data, and therefore, details are not described herein.

Returning to FIG. 3, the overflow setting may further include a function of overflow early warning 43 that sends an early warning notification to the application entity in the condition that the stored data reaches the early warning threshold. For example, in the condition that the stored data reaches the early warning threshold, the early warning notification is sent to other application entities subscribing to resource of data in the general service entity.

Figure 13:
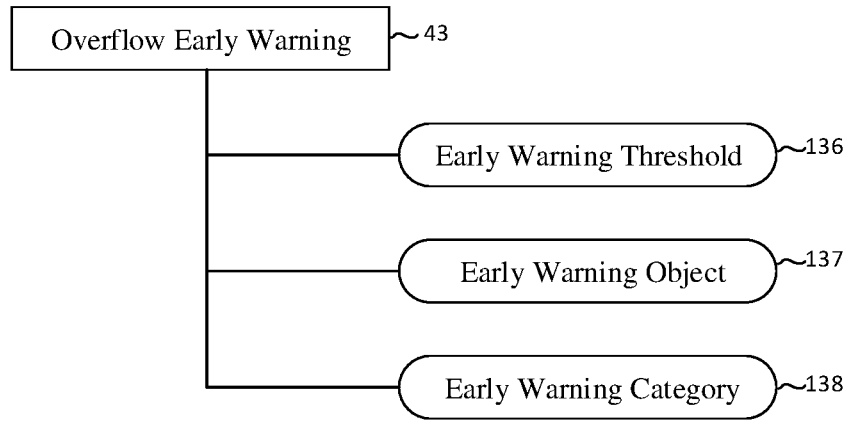
FIG. 13 is a schematic diagram of setting an overflow resource warning according to an embodiment of the present disclosure.

FIG. 13 is a schematic diagram of setting an overflow resource warning according to an embodiment of the present disclosure. As illustrated in FIG. 13, an early warning threshold (warningLevel) 136, an early warning object (notificationURI) 137, an early warning category (warningCat) 138, and the like can be set for the overflow early warning 43. The early warning object (notificationURI) 137 indicates the object or target address that needs to be provided early warning. The early warning category 138 indicates the specific overflow category that needs to be provided early warning, such as one or more of a group consisting of the maximum bit value (maxByteSize), the maximum number of instances (maxNrOfInstances), the maximum instance service life (maxInstanceAge), and the like as described above. The early warning threshold 136 indicates that an early warning notification is issued when a certain category reaches a predetermined threshold. For example, the early warning category can be set to the maximum bit value, and the corresponding early warning threshold is 75%. When the maximum bit value of the stored data reaches 75% of the maximum capacity, an early warning notification is sent to the target address. It should be noted that the above settings are merely illustrative and do not limit the content to be protected by the present disclosure, and the present disclosure may also include other appropriate settings.

Moreover, in addition to the function of setting the early warning notification in the overflow setting, the resource with subscription function in the general service entity corresponding to other application entities may also include the function of issuing the early warning notification. In this way, in the case where the attribute of the subscribed resource is greater than the prescribed early warning threshold, an early warning notification may also be sent to the target address, and details are not described herein.

Figure 14:
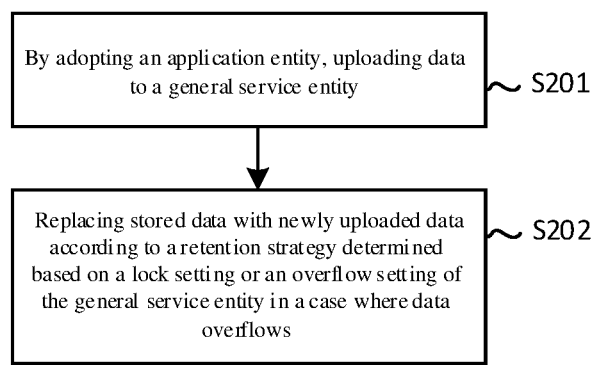
FIG. 14 is a flowchart of a method for data storage according to another embodiment of the present disclosure.

Hereinafter, a method for data storage according to another embodiment of the present disclosure is described with reference to FIG. 14, and the method may be executed by the application entity 10.

Step S201: by adopting an application entity, uploading data to a general service entity.

Step S202: replacing stored data with newly uploaded data according to a retention strategy determined based on an overflow setting of the general service entity in a case where data overflows. As described above, in the case where the data overflow occurs, a corresponding retention strategy is selected for the stored data according to the lock setting or overflow setting, so that the loss of data can be accordingly avoided.

For example, the retention strategy may include at least one of following retention strategies: performing a local backup of the stored data, uploading and backing up the stored data, partially retaining the stored data according to a point in time, partially retaining the stored data according to a rate of change, partially retaining the stored data according to a difference manner, and/or replacing the stored data with newly uploaded data. Because the above strategies have been described in detail above, and details are not described herein.

Further, the overflow setting may further include receiving an early warning notification sent by the general service entity in a case where the stored data is about to overflow.

In addition, other application entities can obtain required target data from the general service entity. For example, other application entities obtaining the required target data from the general service entity includes: in a case where all of the target data is stored in the general service entity, other application entities directly extract the target data from the general service entity; in a case where part of the target data is stored in the general service entity and part of the target data is backed up to other general service entities, the other application entities extract corresponding target data from the general service entity and the other general service entities, or the general service entity extracts part of the target data, which is not stored in the general service entity, from the other general service entities and sends all of the target data to the other application entities; and in a case where all of the target data is stored in the other general service entities, the other application entities directly extract the target data from the other general service entities, or the general service entity extracts the target data from the other general service entities and sends the target data to the other application entities.

For example, in the case where the general service entity uploads and backs up the data stored in the application entity, other application entities may obtain the required target data from the general service entity through two steps: (1) obtaining the address list; (2) obtaining according to the address. When a user entity wants to use history data at a certain moment in history, for example, when the user entity wants to obtain typhoon wind sampling data from 1st to 8th days on the 20th day, the other application entities should first perform the discovery operation on the registered CSE (for example, the registered CSE here may be the MN-CSE described above, and as an example, the registered CSE below is expressed as the MN-CSE) corresponding to the application entity that uploads the data. The operation information specifies the time interval for data generation. The possible cases that the MN-CSE (the registered CSE) replies the data storage address list to the other application entities include:

(1) all of the data is stored in the MN-CSE;
(2) part of the data is stored in the MN-CSE, and part of the data is backed up and stored in the CSE;
(3) all of the data is backed up and stored in the CSE.

FIG. 15 to FIG. 18 are schematic diagrams of examples in which other application entities obtain required target data from a general service entity according to an embodiment of the present disclosure.

Figure 15:
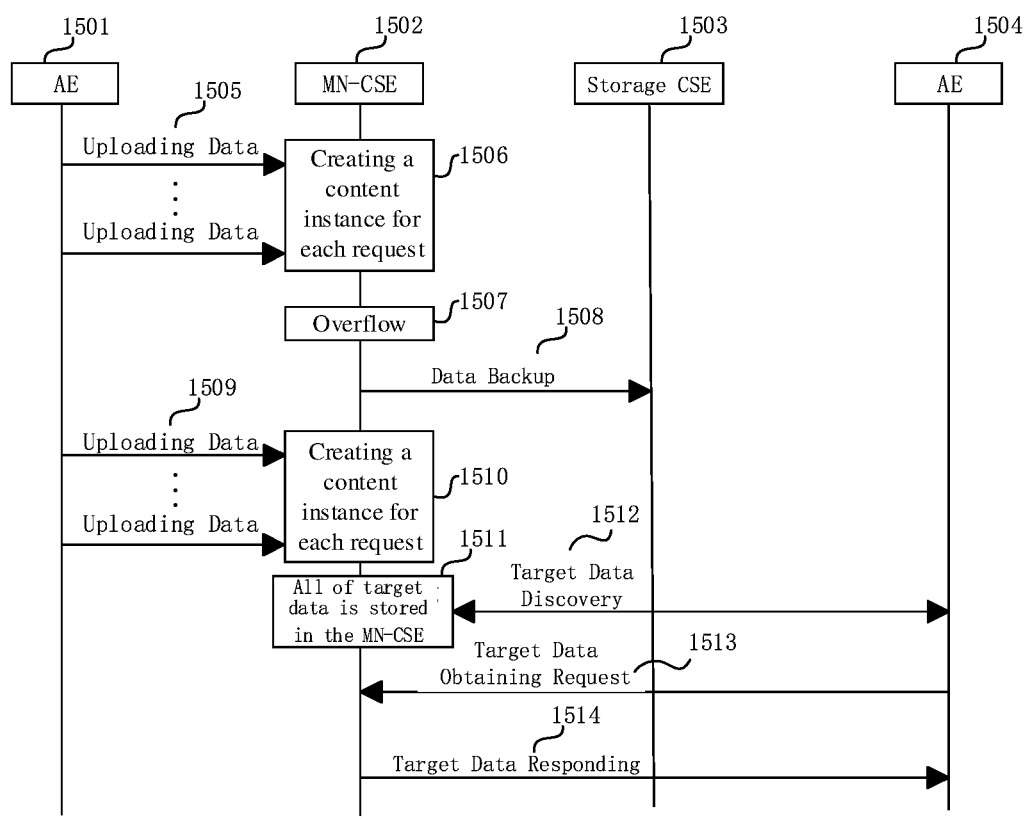
FIG. 15 is a schematic diagram of an example in which other application entities obtain required target data from a general service entity according to an embodiment of the present disclosure.

FIG. 15 is a schematic diagram of an example in which other application entities obtain the required target data from the general service entity in the case where all of the target data is stored in the MN-CSE. As illustrated in FIG. 15, the AE 1501 uploads data 1505 to the MN-CSE 1502, and then the MN-CSE 1502 creates the content instance for each request 1506 of the AE 1501. When the data uploaded by the AE 1501 reaches the maximum capacity storage limit of the MN-CSE 1502, data overflow 1507 occurs. At this time, the MN-CSE 1502 may upload the stored data to other general service entities (for example, the storage CSE 1503 illustrated in FIG. 15) to perform data backup 1508, and may delete the data originally stored in the MN-CSE 1502. Then the MN-CSE 1502 has extra capacity to store the data continuously uploaded 1509 by the AE 1501, and continues to create the content instance 1510 for each request of the AE 1501. At this time, when other application entities (AEs) 1504 want to obtain the required target data from the MN-CSE 1502, the AE 1504 first performs target data discovery 1512 to the MN-CSE 1502, so as to obtain the address list of the required target data, and the stored information of the target data can be obtained based on the obtained address list. For example, in FIG. 15, the target data obtained based on the obtained address list is all stored in the MN-CSE 1502, then the AE 1504 sends a target data obtaining request to the MN-CSE 1502, and the MN-CSE 1502 responds to the request 1514 and sends the data required by the AE 1504 to the AE 1504, thereby completing the process of the AE 1504 obtaining the target data from the MN-CSE 1502.

Figure 16:
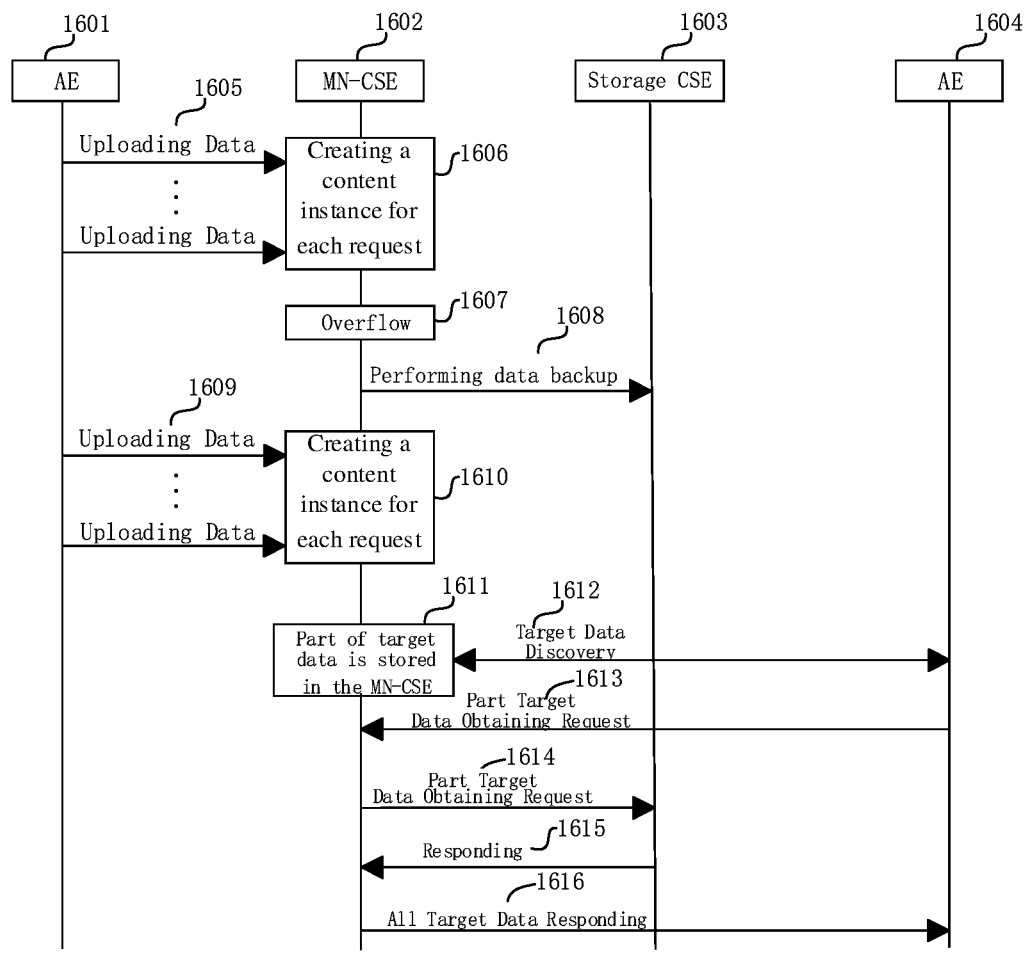
FIG. 16 is a schematic diagram of an example in which other application entities obtain required target data from a general service entity according to another embodiment of the present disclosure.

FIG. 16 is a schematic diagram of an example in which part of the data is stored in the MN-CSE, part of the data is backed up and stored in the CSE, and other application entities obtain the required target data from the general service entity. As illustrated in FIG. 16, the AE 1601 uploads data 1605 to the MN-CSE 1602, and then the MN-CSE 1602 creates the content instance 1606 for each request of the AE 1601. When the data uploaded by the AE 1601 reaches the maximum capacity storage limit of the MN-CSE 1602, data overflow 1607 occurs. At this time, the MN-CSE 1602 may upload the stored data to other general service entities (for example, the storage CSE 1603 illustrated in FIG. 16) to perform data backup 1608, and may delete the data originally stored in the MN-CSE 1602. Then the MN-CSE 1602 has extra capacity to store the data continuously uploaded 1609 by the AE 1601, and continues to create the content instance 1610 for each request of the AE 1601. At this time, when other application entities (AEs) 1604 want to obtain the required target data from the MN-CSE 1602, the AE 1604 first performs target data discovery 1612 to the MN-CSE 1602, so as to obtain the address list of the required target data, and the stored information of the target data can be obtained based on the obtained address list. For example, in FIG. 16, part of the target data obtained based on the obtained address list is stored in the MN-CSE 1602, and part of the target data is backed up and stored in the CSE 1603. Then the AE 1604 sends a part target data obtaining request 1613 to the MN-CSE 1602, and the MN-CSE 1602 sends a part target data obtaining request 1614 to the storage CSE 1603 as well. The storage CSE 1603 feeds back the part of the target data stored in the storage CSE 1603 to the MN-CSE 1602 in response 1615 to the part target data obtaining request 1614, and the MN-CSE 1602 sends the part of the target data stored in the MN-CSE 1602 and the part of the target data fed back by the storage CSE 1603 to the AE 1604, thereby completing the process of the AE 1604 obtaining the target data from the MN-CSE 1602.

Figure 17:
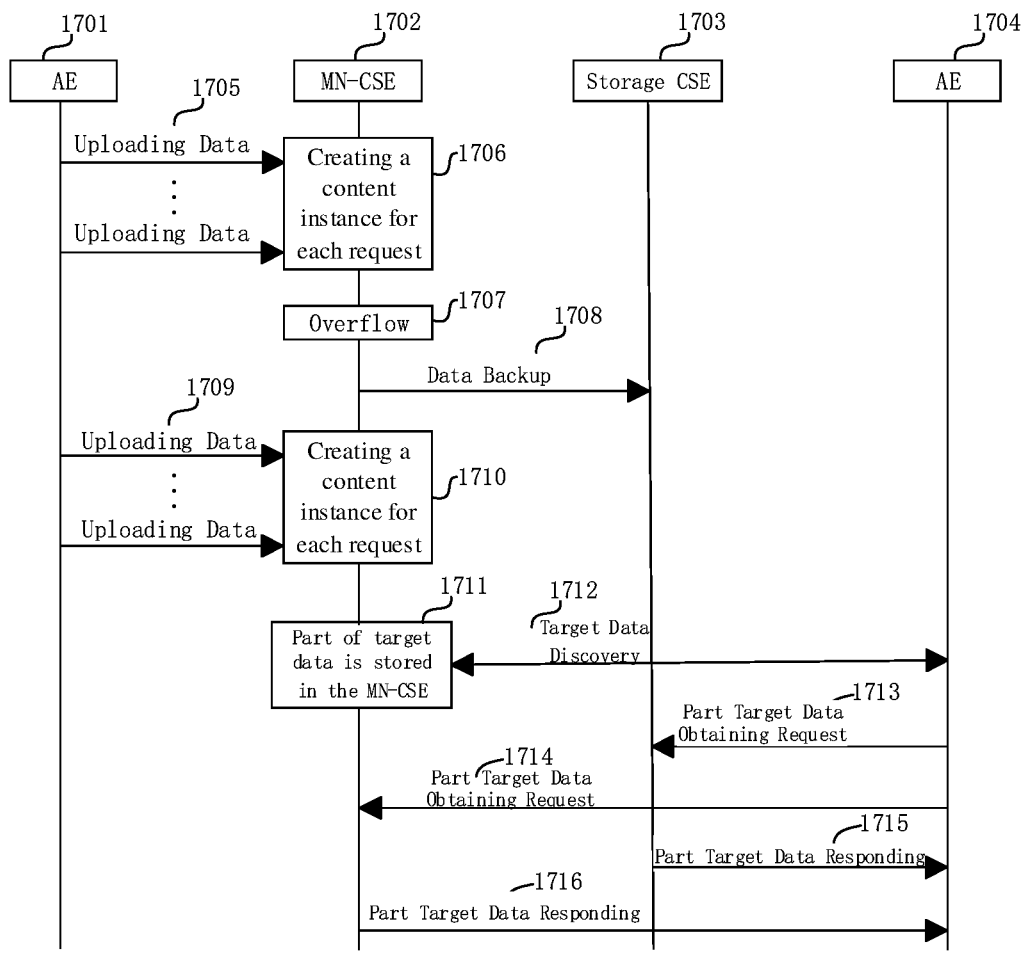
FIG. 17 is a schematic diagram of an example in which other application entities obtain required target data from a general service entity according to still another embodiment of the present disclosure.

FIG. 17 is a schematic diagram of an example in which part of the data is stored in the MN-CSE, part of the data is backed up and stored in the CSE, and other application entities obtain the required target data from the general service entity. As illustrated in FIG. 17, the AE 1701 uploads data 1705 to the MN-CSE 1702, and then the MN-CSE 1702 creates the content instance 1706 for each request of the AE 1701. When the data uploaded by the AE 1701 reaches the maximum capacity storage limit of the MN-CSE 1702, data overflow 1707 occurs. At this time, the MN-CSE 1702 may upload the stored data to other general service entities (for example, the storage CSE 1703 illustrated in FIG. 17) to perform data backup 1708, and may delete the data originally stored in the MN-CSE 1702. Then the MN-CSE 1702 has extra capacity to store the data continuously uploaded 1709 by the AE 1701, and continues to create the content instance 1710 for each request of the AE 1701. At this time, when other application entities (AEs) 1704 want to obtain the required target data from the MN-CSE 1702, the AE 1704 first performs target data discovery 1712 to the MN-CSE 1702, so as to obtain the address list of the required target data, and the stored information of the target data can be obtained based on the obtained address list. For example, in FIG. 17, part of the target data obtained based on the obtained address list is stored in the MN-CSE 1702, and part of the target data is backed up and stored in the CSE 1703. Then the AE 1704 sends a part target data obtaining request 1714 to the MN-CSE 1702, and simultaneously sends a part target data obtaining request 1713 to the storage CSE 1703 as well. The storage CSE 1703 feeds back the part of the target data stored in the storage CSE 1703 to the AE 1704 in response 1715 to the part target data obtaining request 1713, and the MN-CSE 1702 feeds back the part of the target data stored in the MN-CSE 1702 to the AE 1704 in response 1716 to the part target data obtaining request 1714, thereby completing the process of the AE 1704 obtaining all of the target data from the MN-CSE 1702.

Figure 18:
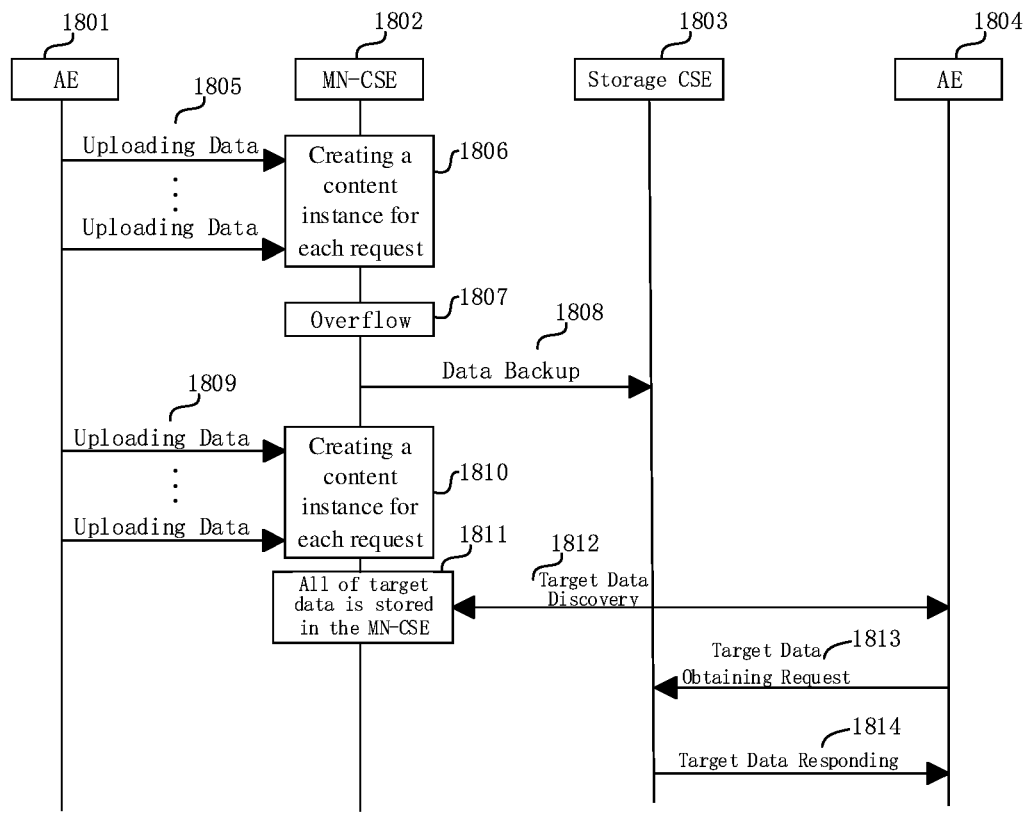
FIG. 18 is a schematic diagram of an example in which other application entities obtain required target data from a general service entity according to further still another embodiment of the present disclosure.

FIG. 18 is a schematic diagram of an example in which other application entities obtain the required target data from the general service entity in the case where all of the data is stored in the storage CSE. As illustrated in FIG. 18, the AE 1801 uploads data 1805 to the MN-CSE 1802, and then the MN-CSE 1802 creates the content instance 1806 for each request of the AE 1801. When the data uploaded by the AE 1801 reaches the maximum capacity storage limit of the MN-CSE 1802, data overflow 1807 occurs. At this time, the MN-CSE 1802 may upload the stored data to other general service entities (for example, the storage CSE 1803 illustrated in FIG. 18) to perform data backup 1808, and may delete the data originally stored in the MN-CSE 1802. Then the MN-CSE 1802 has extra capacity to store the data continuously uploaded 1809 by the AE 1801, and continues to create the content instance 1810 for each request of the AE 1801. At this time, when other application entities (AEs) 1804 want to obtain the required target data from the MN-CSE 1802, the AE 1804 first performs target data discovery 1812 to the MN-CSE 1802, so as to obtain the address list of the required target data, and the stored information of the target data can be obtained based on the obtained address list. For example, in FIG. 18, the target data obtained based on the obtained address list is all stored in the storage CSE, then the AE 1804 sends a target data obtaining request 1813 to the storage CSE 1803, and the storage CSE 1803 responds 1814 to the target data obtaining request 1813 and sends all of the target data stored in the storage CSE 1803 to the AE 1804, thereby completing the process of the AE 1804 obtaining all of the target data from the MN-CSE 1802. Alternatively, the MN-CSE 1802 may be as illustrated in FIG. 16, the MN-CSE 1802 may send the target data obtaining request to the storage CSE 1803, then the storage CSE 1803 responds to the target data obtaining request and sends the target data stored in the storage CSE 1803 to the MN-CSE 1802, and the MN-CSE 1802 sends all the received target data to the AE 1804, thereby completing the process of the AE 1804 obtaining the target data from the MN-CSE 1802.

Different methods for data storage are described above, which may be applied in different fields. For example, when a driving recorder records data in real time, the method for data storage is basically local storage, which is usually due to the storage space of the memory card, so that the new data is stored by overwriting the old data. In such scenarios, once emergency scenes such as sudden brakes and collisions occur, it is necessary to store the recordings in that period. Even if the capacity of the memory card is full, certain specific resources should be marked when implementing resource overwriting, so that these certain specific resources cannot be overwritten by new image or video data and may be available in subsequent processing. In this case, the method for data storage provided by the present disclosure as described above may be used, so that the old data cannot be completely overwritten, so that the old data is available according to requirements. In the following, the steps of using the method for data storage provided by the present disclosure in the case of storing the data recorded by the driving recorder in real time are described.

1) Step one:

assuming that a vehicle collision occurs at time T1, the collision triggers settings, and the lock time period is set according to the storage settings (for example, data of a period of two minutes prior to the collision time and two minutes subsequent to the collision time is stored).

The attribute value overflowReserve includes list data addition fields (T1−2) min to (T1+2) min.

The attribute value overflowReserveStatus includes True, which means that the existing instance of the instance queue has been locked (the locked content instance may not be deleted subsequent to the data overflow).

2) Step two:

when the memory card space occurs overflow, although the original data is overwritten, since there is already a lock strategy, the newly created data content instance may not overwrite the data prior to and subsequent to the collision time.

3) Step three:

the data recording video at the collision time is verified, the data instance at the collision time is obtained, and the lock status of the data may be released after ensuring that the data instance is useless. For example, the list-type data deletion is performed on the attribute value overflowReserve to delete original fields (T1−2) min to (T1+2) min, and in this way, the data corresponding to this time period may lose the lock attribute. When the memory card occurs overflow again, the data corresponding to this time period may be deleted according to the creation time.

For example, natural environment data records include data records of extreme weather, such as storms, typhoons, tsunamis, etc. Because the above data is sudden, large in quantity, and changes fast, and is different from ordinary sensor data detection of smart home, huge amounts of data may be uploaded in a short time. At the same time, the above data has great value for scientific research and scientific application, and therefore has high-level importance. If the existing standard implementation method is adopted, due to the sudden nature of the natural environment, it is impossible to predict the occurrence scale and duration and is difficult to estimate the data capacity. Once the data storage reaches the upper limit of data capacity, the hidden danger of deleting old data for storing new data is the loss of the hidden value of important data.

According to the present disclosure, because of the importance of natural environment data, a complete backup method can be adopted. In the following, the steps of using the method for data storage provided by the present disclosure in the case of storing natural environment data are described.

1) Step one: performing the overflow setting (overflowCfg).

The overflow setting may be performed on the general service entity or content storage resource (container) corresponding to the application entity (for example, a sensor).

For example, the attribute value overflowStatus is set to False (representing the default value in the case where no overflow occurs), which means that no overflow is found in the data at the moment, and the maximum resource limit set for the general service entity still has margin.

The attribute value overflowCat is set to maxNrOfInstances. Because the size of the own data has a basically certain data unit size based on the sensor properties, the sudden change in the number of instances is in large quantity in case of dealing with emergencies.

The attribute value overflowCtrl is set to True, which means that the retention strategy for overflow may be executed once an overflow event occurs.

The attribute value overflowOp is set to B, which means that if overflow occurs, the stored data may be uploaded and backed up. For example, the root directory location (overflowUpLoadPosition) attribute value of the upload resource is set to an address AAA.

2) Step two: implementing the retention strategy in case of emergencies.

In the case where overflow occurs (t=time1):

the attribute value overflowStatus of the resource overflowCfg may be the first changed attribute value and may change from False to True; and according to overflowOp=B, the resource backup is uploaded, the data in the parent resource corresponding to the resource overflowCfg is uploaded to the address AAA, the time1 is added to the overflowUploadTimePoint, and the resource address is backed up and added to the overflowUploadList.

3) Step three: extracting and utilizing history data.

As described above, in the case where the general service entity uploads and backs up the data stored in the application entity, other application entities may obtain the required target data from the general service entity through two steps: (1) obtaining the address list; (2) obtaining according to the address. When a user entity wants to use history data at a certain moment in history, for example, when the user entity wants to obtain typhoon wind sampling data from 1st to 8th days on the 20th day, the other application entities should first perform the discovery operation on the MN-CSE (the registered CSE) corresponding to the application entity which uploads the data. The operation information specifies the time interval for data generation. The possible cases that the MN-CSE (the registered CSE) replies the data storage address list to the other application entities include: all of the data being stored in the MN-CSE; part of the data being stored in the MN-CSE, and part of the data being backed up and stored in the CSE; and all of the data being backed up and stored in the CSE.

As analyzed above, there are different strategies for different situations. For example, in the case where all of the target data is stored in the general service entity, other application entities directly extract the target data from the general service entity; in the case where part of the target data is stored in the general service entity and part of the target data is backed up to other general service entities, the other application entities extract corresponding target data from the general service entity and the other general service entities, or the general service entity extracts part of the target data, which is not stored in the general service entity, from the other general service entities and sends all of the target data to the other application entities; and in the case where all of the target data is stored in the other general service entities, the other application entities directly extract the target data from the other general service entities, or the general service entity extracts the target data from the other general service entities and sends the target data to the other application entities. The above-mentioned different strategies have been described in detail with reference to FIG. 15 to FIG. 18 in the present disclosure, and therefore, details are not described herein.

Figure 19:
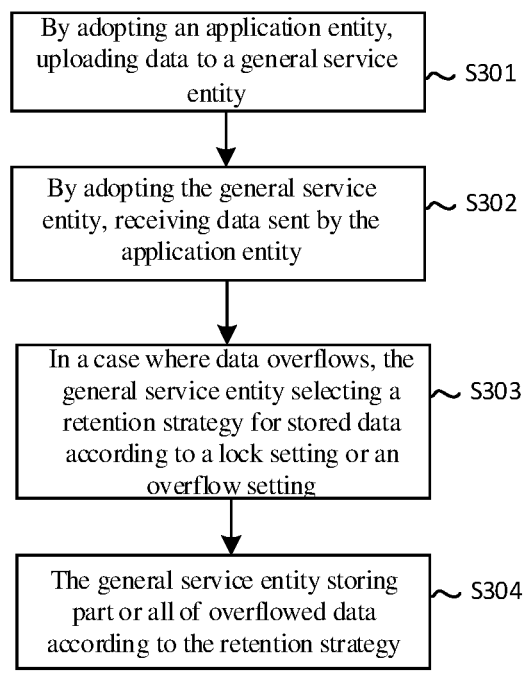
FIG. 19 is a flowchart of a method for data storage according to still another embodiment of the present disclosure.

As described above, the present disclosure provides a method for data storage. FIG. 19 is a flowchart of a method for data storage according to still another embodiment of the present disclosure. As illustrated in FIG. 19, the method for data storage provided by the present disclosure includes: by adopting an application entity, uploading data to a general service entity (S301); by adopting the general service entity, receiving data sent by the application entity (S302); and in a case where data overflows, the general service entity selecting a retention strategy for stored data according to a lock setting or an overflow setting (S303); and the general service entity storing part or all of overflowed data according to the retention strategy (S304).

Figure 20:
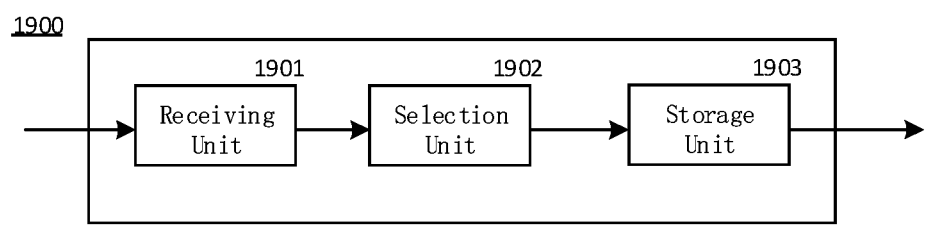
FIG. 20 is a schematic diagram of a device for data storage according to an embodiment of the present disclosure.

The device 1900 for data storage according to the embodiments of the present disclosure is described below with reference to FIG. 20. FIG. 20 is a schematic diagram of a device for data storage according to an embodiment of the present disclosure. Because the functions of the device for data storage provided by the embodiments are the same as those of the method described above with reference to FIG. 2, and therefore, detailed description of the same content is omitted herein for simplicity.

As illustrated in FIG. 20, the device 1900 for data storage includes a receiving unit 1901, a selection unit 1902, and a storage unit 1903. It should be noted that although the device 1900 for data storage is illustrated as including only three devices in FIG. 20, the above is only illustrative, and the device 1900 for data storage may also include one or more other devices, which do not involve the inventive concept and therefore, are omitted herein.

The device 1900 for data storage provided by the present disclosure includes: a receiving unit 1901, configured to receive data sent by an application entity by adopting a general service entity; a selection unit 1902, configured to perform a lock setting or an overflow setting for stored data in a case where data overflows and select a retention strategy for the stored data according to the lock setting or the overflow setting; and a storage unit 1903, configured to store part or all of overflowed data according to the retention strategy.

The selection unit 1902 selects at least one of following retention strategies: performing a local backup of the stored data, uploading and backing up the stored data, partially retaining the stored data according to a point in time, partially retaining the stored data according to a rate of change, partially retaining the stored data according to a difference manner, and/or replacing the stored data with newly uploaded data.

For example, the overflow setting further includes: sending an early warning notification to the application entity in a case where the stored data reaches the early warning threshold. For example, resource with subscription function in the general service entity corresponding to other application entities may also include the function of sending the early warning notification.

For example, the overflow setting includes whether to perform the lock setting on the data. For example, the lock setting includes performing the lock setting on the stored data according to the lock time period or the rate of change of lock data. For example, in the case where data overflows, stored data generated during a preset lock time period or stored data in accord with a preset range of the rate of change of lock data may be locked and may not be deleted.

For example, the overflow setting further includes setting the specific overflow category.

For example, the overflow setting further includes setting an overflow status of whether an overflow occurs.

For example, the overflow setting further includes setting whether a corresponding operation to be performed subsequent to the overflow.

For example, the overflow setting further includes setting the operation to be performed subsequent to the overflow.

Figure 21:
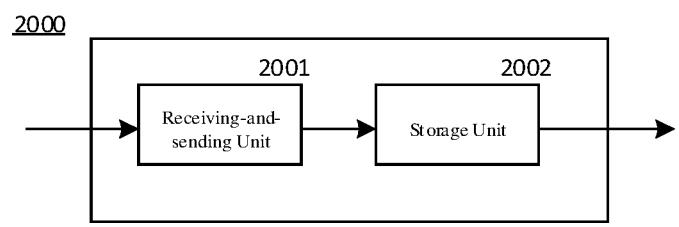
FIG. 21 is a schematic diagram of a device for data storage according to another embodiment of the present disclosure.

The device 2000 for data storage according to another embodiment of the present disclosure is described below with reference to FIG. 21. FIG. 21 is a schematic diagram of a device for data storage according to another embodiment of the present disclosure. Because the functions of the device for data storage provided by the embodiments are the same as those of the method described above with reference to FIG. 14, and therefore, detailed description of the same content is omitted herein for simplicity.

As illustrated in FIG. 21, the device 2000 for data storage includes a receiving-and-sending unit 2001, and a storage unit 2002. It should be noted that although the device 2000 for data storage is illustrated as including only two devices in FIG. 21, the above is only illustrative, and the device 2000 for data storage may also include one or more other devices, which do not involve the inventive concept and therefore, are omitted herein.

The device 2000 for data storage provided by the present disclosure includes: a receiving-and-sending unit 2001, configured to upload data to a general service entity by adopting an application entity; and a storage unit 2002, configure to replace stored data with newly uploaded data according to a retention strategy determined based on an overflow setting of the general service entity in a case where data overflows. In addition, the receiving-and-sending unit 2001 may also receive an early warning notification sent by the general service entity in a case where the stored data reaches an early warning threshold.

The retention strategy includes at least one of following retention strategies: performing a local backup of the stored data, uploading and backing up the stored data, partially retaining the stored data according to a point in time, partially retaining the stored data according to a rate of change, partially retaining the stored data according to a difference manner, and/or replacing the stored data with newly uploaded data.

For example, the overflow setting further includes: receiving an early warning notification sent by the general service entity in a case where the stored data reaches an early warning threshold.

For example, other application entities can obtain required target data from the general service entity. For example, other application entities obtaining required target data from the general service entity includes: in a case where all of the target data is stored in the general service entity, other application entities directly extract the target data from the general service entity; in a case where part of the target data is stored in the general service entity and part of the target data is backed up to other general service entities, the other application entities extract corresponding target data from the general service entity and the other general service entities, or the general service entity extracts part of the target data, which is not stored in the general service entity, from the other general service entities and sends all of the target data to the other application entities; and in a case where all of the target data is stored in the other general service entities, the other application entities directly extract the target data from the other general service entities, or the general service entity extracts the target data from the other general service entities and sends the target data to the other application entities.

According to still another aspect of the present disclosure, a computer readable storage medium for storing a computer readable program is provided, and the program enables a computer to perform the method for data storage according to the above aspect of the present disclosure.

Those skilled in the art can understand that various aspects of the present disclosure can be explained and described through a number of patentable categories or situations, including any new and useful process, machine, product, or combination of substances, or any new and useful improvements thereto. Correspondingly, various aspects of the present disclosure can be completely executed by hardware, can be completely executed by software (including firmware, resident software, microcode, etc.), or can be executed by a combination of hardware and software. The above hardware or software can be referred to as "a data block", "a module", "an engine", "a unit", "a component", or "a system". In addition, various aspects of the present disclosure may be embodied as a computer product located in one or more computer-readable media, and the product includes computer readable program codes.

The present disclosure uses specific words to describe the embodiments of the present disclosure. For example, "one embodiment", "an embodiment", and/or "some embodiments" may mean a certain feature, structure, or characteristic related to at least one embodiment of the present disclosure. Therefore, it should be emphasized and noted that "one embodiment", "an embodiment", or "an alternative embodiment" mentioned twice or more at different positions in this specification may not necessarily refer to the same embodiment. In addition, certain features, structures, or characteristics in one or more embodiments of the present disclosure can be appropriately combined.

Unless otherwise defined, all terms (including technical terms and scientific terms) used herein have the same meaning as commonly understood by those skilled in the art to which the present disclosure belongs. It should also be understood that terms such as those defined in ordinary dictionaries should be interpreted as having meanings consistent with the meanings in the context of related technologies, and should not be interpreted in idealized or extremely formalized meanings, unless explicitly defined herein.

The above is an explanation of the present disclosure and should not be regarded as a limitation. Although several exemplary embodiments of the present disclosure have been described, those skilled in the art will readily understand that many modifications can be made to the exemplary embodiments without departing from the novel teachings and advantages of the present disclosure. Therefore, all these modifications are intended to be included in the scope of the present disclosure defined by the claims. It should be understood that the above is an explanation of the present disclosure, and should not be considered as being limited to the specific embodiments disclosed, and modifications to the disclosed embodiments and other embodiments are intended to be included in the scope of the appended claims. The present disclosure is defined by the claims and their equivalents.

What is claimed is:

1. A method for data storage, comprising:
   by adopting a general service entity, receiving data sent by an application entity;
   performing a lock setting or an overflow setting;
   selecting a retention strategy for previously stored data according to the lock setting in a case of satisfying a data overflow condition; and
   storing part or all of received data according to the retention strategy,
   wherein the lock setting comprises locking the stored data according to a lock time period or a rate of change of lock data, and
   in the case of satisfying the data overflow condition, stored data corresponding to a preset lock time period or stored data in accord with a preset range of the rate of change of lock data is locked, and locked data is not deleted while storing newly received data.

2. The method according to claim 1, further comprising:
   selecting the retention strategy for previously stored data further according to the overflow setting in the case of satisfying the data overflow condition;
   wherein selecting the retention strategy for previously stored data according to the lock setting or the overflow setting comprises:
   selecting at least one of following retention strategies for the stored data:
   performing a local backup of the stored data and replacing the stored data with newly uploaded data,
   uploading and backing up the stored data and replacing the stored data with the newly uploaded data,
   partially retaining the stored data according to a point in time and storing the newly uploaded data,
   partially retaining the stored data according to a rate of change and storing the newly uploaded data, or
   partially retaining the stored data according to a difference manner and storing the newly uploaded data.

3. The method according to claim 1, wherein satisfying the data overflow condition comprises:
   satisfying a condition that the stored data reaches an early warning threshold.

4. The method according to claim 3, further comprising:
   sending an early warning notification to the application entity in a case where the stored data reaches the early warning threshold.

5. The method according to claim 4, wherein the early warning notification comprises an early warning object, an early warning category, and the early warning threshold.

6. The method according to claim 5, wherein the early warning category comprises one or more of a group consisting of a maximum bit value, a maximum number of instances, and a maximum instance service life.

7. The method according to claim 5, wherein performing the overflow setting further comprises:
   setting an overflow status of whether the early warning category overflows.

8. The method according to claim 3, wherein, in the condition that the stored data reaches the early warning threshold, an early warning notification is sent to other application entities subscribing to resource of data in the general service entity.

9. The method according to claim 1, wherein satisfying the data overflow condition comprises:
   satisfying a condition that data overflows.

10. The method according to claim 1, wherein performing the overflow setting comprises:
    performing a lock setting to at least part of the stored data.

11. The method according to claim 1, further comprising:
modifying the lock time period or the range of the rate of change of lock data; and
re-locking the stored data according to a modified lock time period or a modified range of rate of change of lock data.

12. The method according to claim 1, wherein performing the overflow setting further comprises:
setting an operation to be performed subsequent to overflow.

13. The method according to claim 12, wherein the operation to be performed subsequent to overflow comprises at least one of following operations:
setting an overflow time interval,
setting an overflow replacement start point and an overflow value interval, or
setting an overflow retention time.

14. A method for data storage, comprising:
by adopting an application entity, uploading data to a general service entity, wherein the data is stored in the general service entity; and
replacing stored data in the general service entity with newly uploaded data according to a retention strategy determined based on a lock setting of the general service entity in a case of satisfying a data overflow condition,
wherein the lock setting comprises locking the stored data according to a lock time period or a rate of change of lock data, and
in the case of satisfying the data overflow condition, stored data corresponding to a preset lock time period or stored data in accord with a preset range of the rate of change of lock data is locked, and locked data is not deleted while storing newly received data.

15. A non-transitory computer readable storage medium for storing a computer readable program, wherein the program enables a computer to perform the method for data storage according to claim 1.

16. The method according to claim 14, wherein the retention strategy comprises at least one of following retention strategies:
performing a local backup of the stored data and replacing the stored data with the newly uploaded data,
uploading and backing up the stored data and replacing the stored data with the newly uploaded data,
partially retaining the stored data according to a point in time and storing the newly uploaded data,
partially retaining the stored data according to a rate of change and storing the newly uploaded data, or
partially retaining the stored data according to a difference manner and storing the newly uploaded data.

17. The method according to claim 14, wherein satisfying the data overflow condition comprises:
receiving an early warning notification sent by the general service entity in a case where the stored data reaches an early warning threshold.

18. The method according to claim 14, further comprising:
other application entities obtaining required target data from the general service entity,
wherein, in a case where all of the target data is stored in the general service entity, one or more application entities directly extract the target data from the general service entity;
in a case where part of the target data is stored in the general service entity and part of the target data is backed up to other general service entities, the other application entities extract corresponding target data from the general service entity and the other general service entities, or the general service entity extracts part of the target data, which is not stored in the general service entity, from the other general service entities and sends all of the target data to the other application entities; and
in a case where all of the target data is stored in the other general service entities, the other application entities directly extract the target data from the other general service entities, or the general service entity extracts the target data from the other general service entities and sends the target data to the other application entities.

19. A general service entity device, comprising:
a receiving unit, configured to receive data sent by an application entity;
a storage unit, configured to store the data received by the receiving unit; and
a selection unit, configured to perform a lock setting or an overflow setting for stored data in a case of satisfying a data overflow condition and select a retention strategy for the stored data according to the lock setting or of the stored data,
wherein the storage unit is further configured to store newly received data according to the retention strategy,
wherein the lock setting comprises locking the stored data according to a lock time period or a rate of change of lock data, and
in the case of satisfying the data overflow condition, stored data corresponding to a preset lock time period or stored data in accord with a preset range of the rate of change of lock data is locked, and locked data is not deleted while storing newly received data.

* * * * *